Patented Jan. 31, 1933

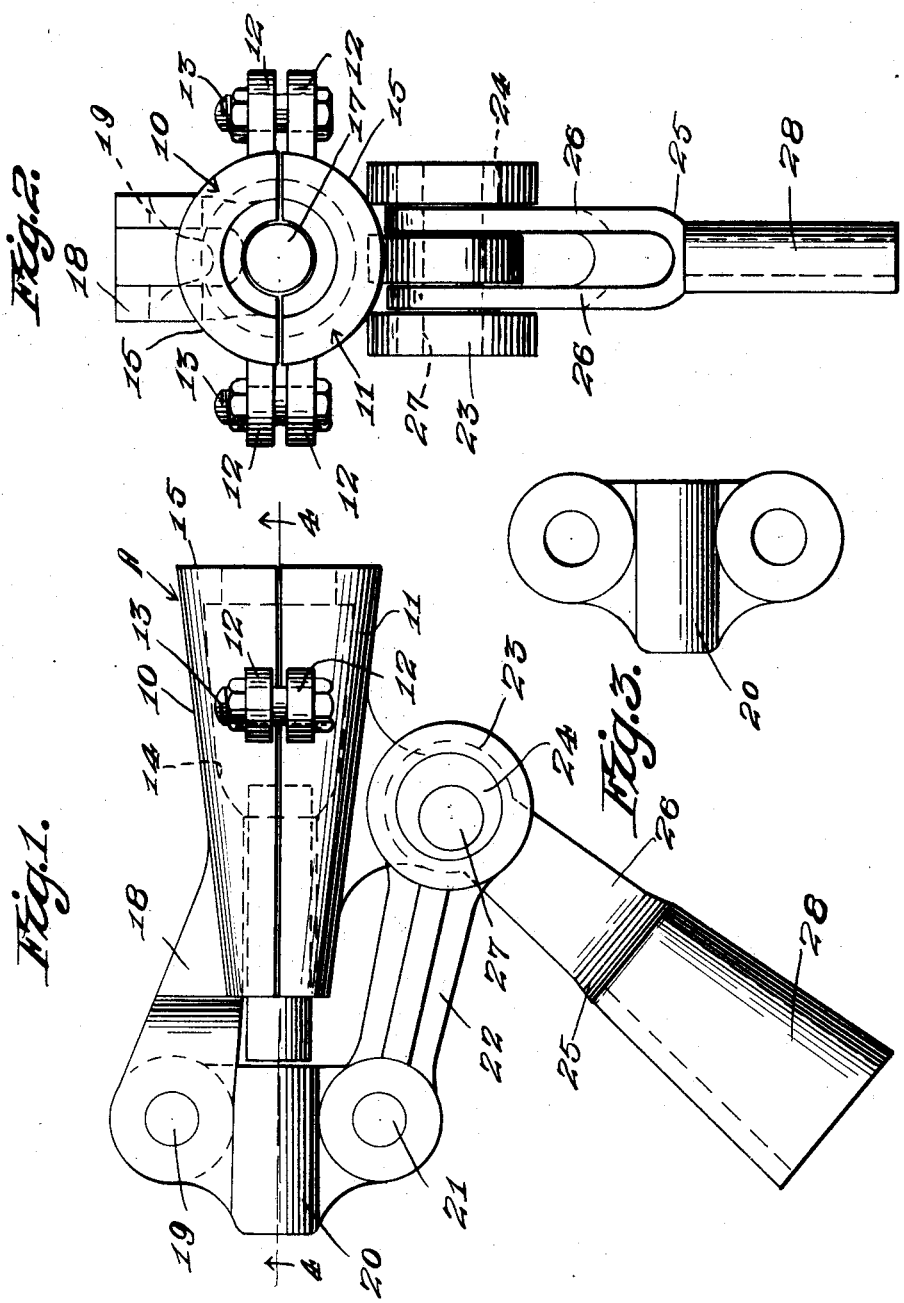

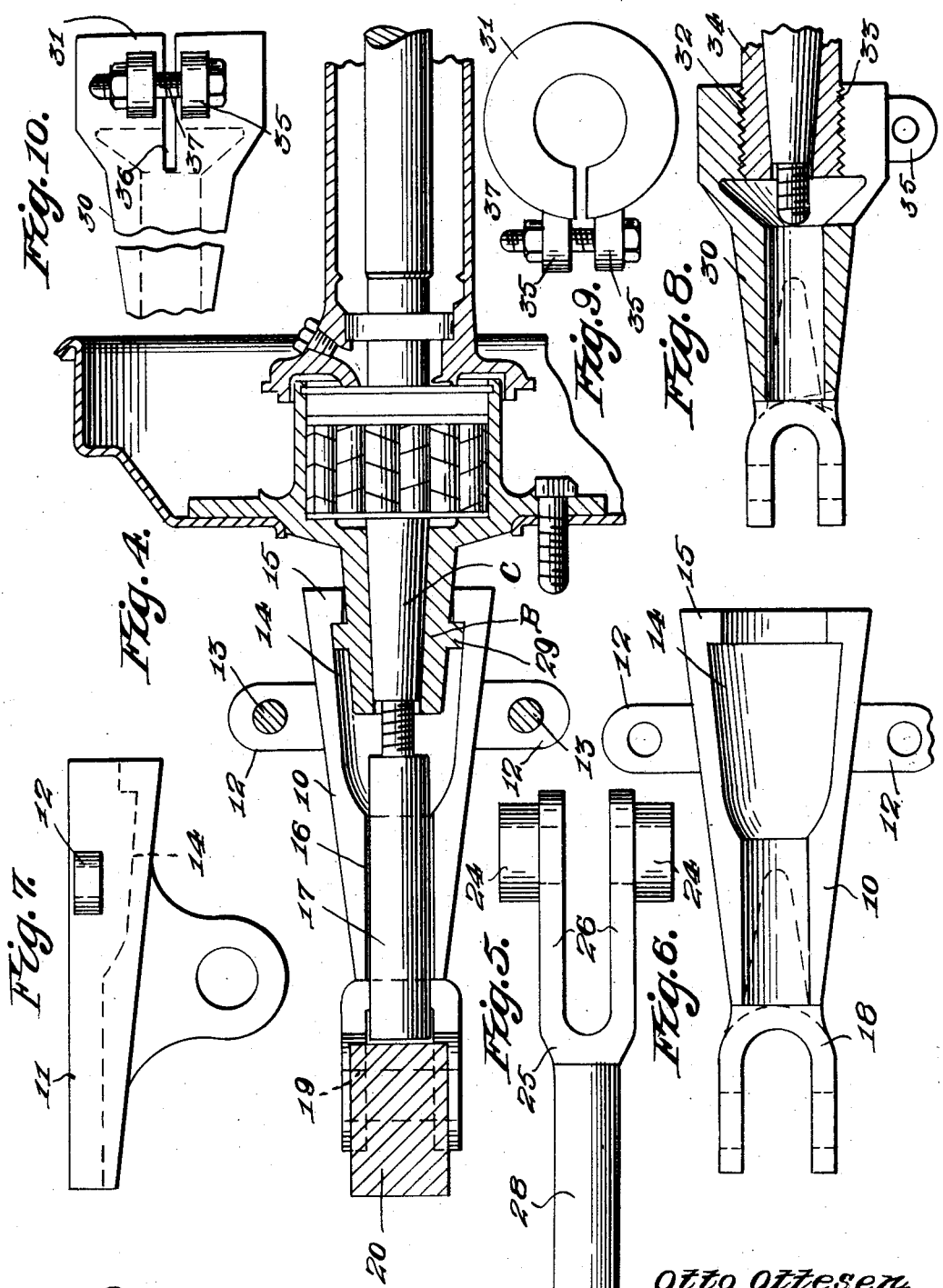

1,896,009

UNITED STATES PATENT OFFICE

OTTO OTTESEN, OF LOS ANGELES, CALIFORNIA

AUTOMOBILE WHEEL PULLER

Application filed March 7, 1932. Serial No. 597,340.

The invention relates to a pulling device and more particularly to an automobile wheel puller.

The primary object of the invention is the provision of a device of this character wherein a wheel having its hub keyed or otherwise splined to an axle can be readily and conveniently pulled therefrom without excessive labor in the use of the device, the latter being provided with a novel form of hub clamp so as to assure a firm and secure grip upon the hub of the wheel and other parts of such device being novel, both in the construction and assembly thereof.

Another object of the invention is the provision of a device of this character, wherein the hub clamp is in the form of a split sleeve adapting it to varying sizes of hubs of wheels and in the use of the device the said wheel can be readily removed or extracted for its disengagement from an axle.

A further object of the invention is the provision of a device of this character which is extremely simple in construction, thoroughly reliable and efficient in its operation, light of weight yet strong, durable, readily and easily operated, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is a side elevation of a device constructed in accordance with the invention.

Figure 2 is an end elevation thereof.

Figure 3 is a detail side elevation of the ram operating head removed from the device.

Figure 4 is a sectional view on the line 4—4 of Figure 1 showing the device applied to a wheel.

Figure 5 is a detail plan view of the operating lever of the device.

Figure 6 is a plan view of one member of the hub clamp of the device.

Figure 7 is an edge or side elevation thereof.

Figure 8 is a longitudinal sectional view through a modified form of hub clamp.

Figure 9 is an end view.

Figure 10 is a side elevation.

Similar reference characters indicate corresponding parts throughout the several views in the drawings.

Referring to the drawings in detail, particularly Figures 1 to 7 inclusive, which disclose the preferred embodiment of the invention, the device comprises a hub clamp A which is in the form of a longitudinally split sleeve including opposed matched outwardly tapered sections 10 and 11 respectively, these being provided with laterally projected ears 12 at opposite sides thereof for receiving nut carrying bolts 13 and in this fashion the sections 10 and 11 are adjustably united with each other. The sections 10 and 11 of the sleeve or clamp are internally chambered as at 14 and the larger ends of these sections are formed with internal hub embracing jaws 15 while disposed in the smaller end portions of the said sleeve or clamp and working through a suitable central guideway 16 therein is a ram or plunger 17 for a purpose presently described.

On the section 10 at its smaller end is formed a bearing 18 which, through the medium of the pivot 19, has swingingly connected thereto a presser head 20, the latter being in the form of a cross link and by the pivot 21 has connection with throw arms 22, these having eccentric or cam straps 23 embracing eccentrics or cams 24 operable by a lever 25, the latter being formed with a forked end 26 made fast to the axle 27 of the cams 24.

The lever 25 is provided with a suitable socket 28 to accommodate a handle bar (not shown).

In the use of the device before described the clamp A on separating its sections 10 and 11 can be engaged upon the hub B keyed, splined or otherwise made fast upon an axle C as shown in Figure 4 of the drawings, the jaws 12 being locked with an external flange 29 on the hub B, the sections 10 and 11 being brought into clamping engagement by bolts 13 and the ram or plunger 17 contacts with the outer end of the axle C. Now on operating the lever 25 in one direction the ram or plunger 17 will be forced against the axle C and thus the clamp A will be pulled upon to pull the hub B from the axle C as should be clearly apparent.

In Figures 8 to 10 there is shown a slight modificaton of the device, wherein the hub clamp is in the form of an outwardly tapered sleeve 30 having its longitudinal split larger end 31 formed with internal screw threads 32, these being adapted for engagement with companion threads 33 externally upon a hub 34 and in this fashion the clamp is engaged with the hub. The split larger end 31 of the sleeve 30 at one side thereof has laterally projected ears 35 at opposite sides of its slit 36, accommodating a nut carrying bolt 37 and thus the split end 31 can be freed for spreading or brought to contracting condition by such bolt to release or make secure the clamp from and on the hub.

It is of course understood that both the preferred and modified forms of construction with respect to the hub clamp can be varied in size so as to accommodate the same to different types and sizes of hubs for the pulling of the wheel from an axle.

What is claimed is:—

1. In a device of the character described, an expansible and contractible hub clamp, a ram slidably fitted in said clamp, a presser head pivotally supported on the clamp and against the ram, a movable eccentric supported by the clamp, and a connection between the eccentric and said head to impart movement thereto.

2. In a device of the character described, an expansible and contractible hub clamp, a ram slidably fitted in said clamp, a presser head pivotally supported on the clamp and against the ram, a movable eccentric supported by the clamp, a connection between the eccentric and said head to impart movement thereto, and a lever operating said eccentric.

3. In a device of the character described, an expansible and contractible hub clamp, a ram slidably fitted in said clamp, a presser head pivotally supported on the clamp and against the ram, a movable eccentric supported by the clamp, a connection between the eccentric and said head to impart movement thereto, a lever operating said eccentric, and a socketed end portion formed on the lever for accommodating a handle.

4. In a device of the character described, an expansible and contractible hub clamp, a ram slidably fitted in said clamp, a presser head pivotally supported on the clamp and against the ram, a movable eccentric supported by the clamp, a connection between the eccentric and said head to impart movement thereto, a lever operating said eccentric, a socketed end portion formed on the lever for accommodating a handle, and means for securing the clamp in contracted condition.

5. In a device of the character described, an expansible and contractible hub clamp, a ram slidably fitted in said clamp, a presser head pivotally supported on the clamp and against the ram, a movable eccentric supported by the clamp, a connection between the eccentric and said head to impart movement thereto, a lever operating said eccentric, a socketed end portion formed on the lever for accommodating a handle, means for securing the clamp in contracted condition, and means interiorly of the clamp for the attachment thereof to a wheel hub.

In testimony whereof I affix my signature.

OTTO OTTESEN.